United States Patent [19]

Page

[11] 4,247,787
[45] Jan. 27, 1981

[54] POWER SWITCHING APPARATUS

[76] Inventor: Ronald Page, 3750 Edgemont Blvd., #22, Vancouver, British Columbia, Canada, V7R 2P8

[21] Appl. No.: 878,310

[22] Filed: Feb. 16, 1978

[30] Foreign Application Priority Data

Jul. 15, 1977 [CA] Canada ................................ 282878

[51] Int. Cl.³ .......................... H02B 1/24; H02J 4/00
[52] U.S. Cl. ...................................... 307/112; 307/19; 307/86
[58] Field of Search .................. 307/112, 18, 19, 147, 307/149, 85, 86, 29, 42; 361/62

[56] References Cited

U.S. PATENT DOCUMENTS 1,955,311  4/1934  Parsons ................................ 307/112

Primary Examiner—Joseph W. Hartary
Assistant Examiner—S. D. Schreyer
Attorney, Agent, or Firm—Laff, Whitesel & Rockman

[57] ABSTRACT

This invention relates to the arrangement of a switching network intended to be used within an electrical utility station switchyard, which improves the security of power delivery to various loads while at the same time allowing a reduction in the number of required circuit breakers and related gear. The invention is a switching network comprising six conducting branches, each branch containing at least one switching means such as a circuit breaker. The branches are connected at their ends so as to form four 3-sided rings, each branch forming a side of and being shared by two of the rings. As a result, four triple-connected nodes are formed at the end connection points of the branches while the connections between adjacent pairs of switching means within a branch form double-connected nodes. These nodes serve as points for connection thereto of source-/load elements, and each node is isolatable from the other nodes by the operation of a maximum of three of switching means.

8 Claims, 9 Drawing Figures (a)

(b)

POWER SWITCHING APPARATUS

This invention relates to the arrangement of a switching network intended to be used within an electrical utility station switchyard, which improves the security of power delivery to various loads while at the same time allowing a reduction in the number of required circuit breakers and related gear.

Electrical power switchyards provide a location where input power sources are interconnected to improve the security of supply to various loads. Transformers are utilized to step up or down a source of voltage to match the required load voltage. The transformers are normally connected in networks containing a plurality of circuit breakers and connection points to which the load lines and source lines are connected. A fault, such as a short circuit to ground or between lines occurring at the utility station switch yard or associated with the source or load lines requires interruption of the fault by the opening of those circuit breakers which carry the fault current to the fault location. While the fault can be isolated in this manner, the remaining loads should remain unaffected by the fault, and therefore it is desirable to provide redundant power feeding paths to each load.

One structure which has been used successfully is a ring bus in which there is multiplicity of circuit breakers connected around a conductive ring. At locations between the circuit breakers terminations are provided for the connection of either power sources or load elements. It can be seen that each load element is fed from both directions in the ring, i.e., the supply is doubly redundant.

Should a fault occur, the two circuit breakers adjacent to the fault will be tripped (opened), which of course opens the ring. Consequently for some elements the doubly redundant supply is lost since certain loads may not be located in the remaining ring segment between a pair of power sources. That is, the security of supply for some loads is compromised; no redundancy remains for them once the ring has been opened.

Furthermore, if the fault occurs in certain of the load positions, power may have to flow to the remaining loads through an excessive number of breaker contacts. For the ring having N circuit breakers, the power could flow through as many as N-2 sets of circuit breaker contacts, whereas previously the power need only have flowed through N/2 sets of contacts at most.

Nevertheless, the ring bus system is still used for some systems in which the criticality is not great, because there is still some security present due to the doubly redundant power paths when fully operative, and since it requires a relatively small number of circuit breakers for this form of redundant system. In the ring bus form of system, there are as many source and load termination points as there are circuit breakers; i.e., the ratio of circuit breakers to elements is 1.

It will be noted that the power source line and load line terminations both occur in the same switching network and consequently they will be referred to as source/load elements or simply elements, in this specification.

More elaborate electric power utility station switch yards utilize a different scheme in which there are a pair of main power carrying buses between which are connected branches having serial circuit breakers so as to form a multiplicity of intermeshed rings. An element termination can be made between pairs of circuit breakers. If one element must be switched out of service, there is usually at least one pair of the branches left interconnected in an electrically closed ring condition so that the overall system security is not seriously jeopardized. However the efficiency of utilization of circuit breakers is not as good as the aforenoted ring bus system, common ratios of circuit breakers to elements being 2, $1\frac{1}{2}$ or $1\frac{1}{3}$.

It is preferred that no source/load element be connected to the main buses since a fault on either of the buses requires the tripping of all circuit breakers immediately adjacent to the affected bus in order to clear the fault. This results in the opening of all of the branches between the buses, and hence all intermeshed rings, jeopardizing substantially the security of the operative loads. Consequently in North American practice, it is usual that only secure loads are allowed to be connected to the main buses. It should be noted that the limited utilization of the main buses is one of the factors degrading the ratio of circuit breakers to elements.

The ratio of circuit breakers to elements is an important factor since the cost of switchgear is high and efficiency in its use is desirable, particularly in large stations.

In the present invention, however, the ratio of circuit breakers to elements is very low, and particularly for larger stations, approaches "1". The present switching network does not require the use of main buses, and interconnects the various lines or branches in a mesh whereby should isolation of a fault be required, a large portion of the remaining network remains intact with redundant power feeding paths. Consequently the present invention provides a switching network having a relatively more secure system, and with decreased cost of circuit breakers and related apparatus.

This invention is a switching network comprising six conducting branches, each branch containing at least one switching means such as a circuit breaker. The branches are connected at their ends so as to form four 3-sided rings, each branch forming a side of and being shared by two of the rings. As a result, four triple-connected nodes are formed at the end connection points of the branches for connection thereto of source/load elements, and each node is isolatable by the operation of a maximum of three of switching means.

A better understanding of the invention will be obtained by reference to the detailed description below, with reference to the following drawings which are in single-line schematic form, as follows.

Figure 8:
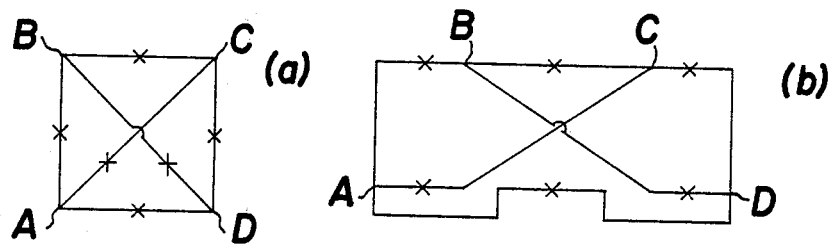
Figure 8:
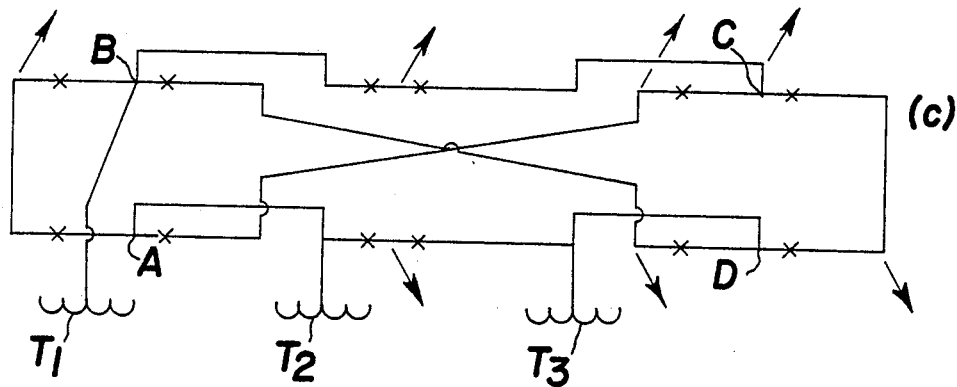
Figure 3:
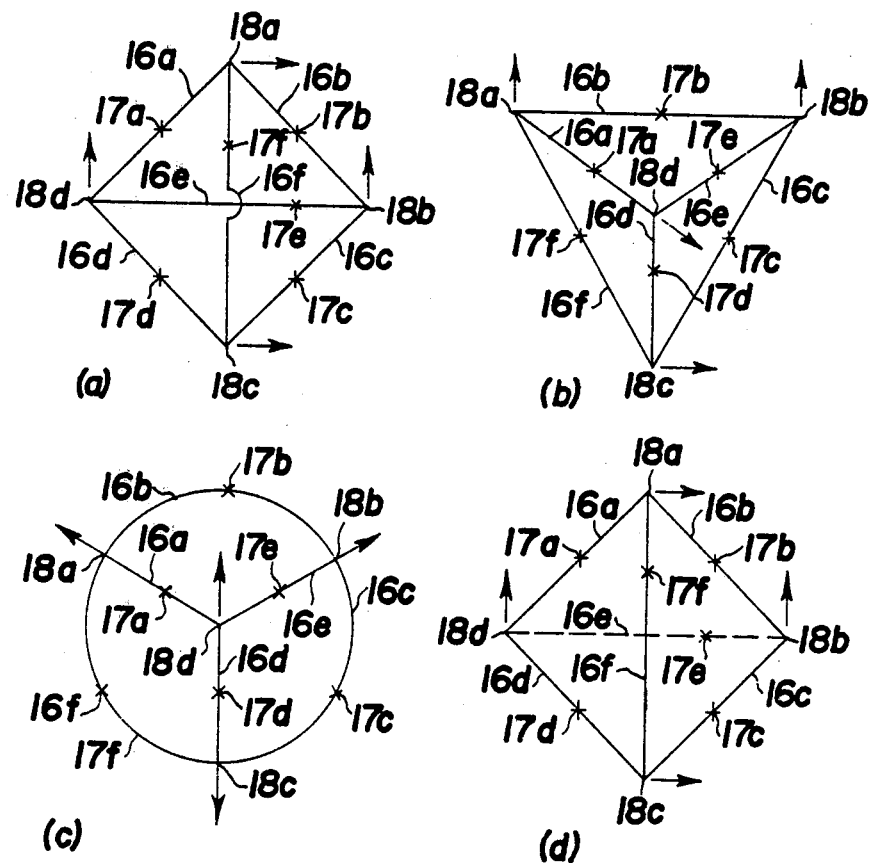
Figure 4:
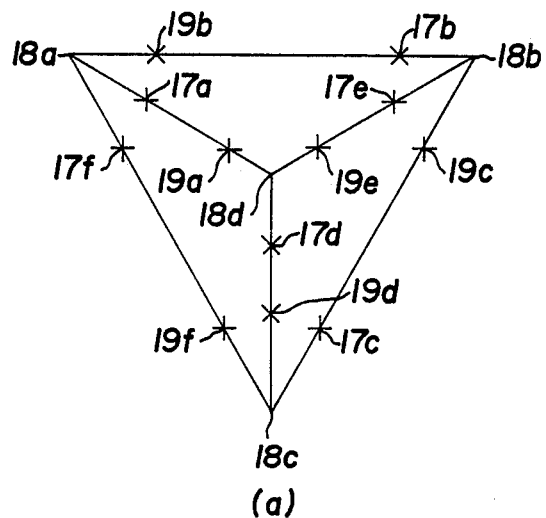
Figure 4:
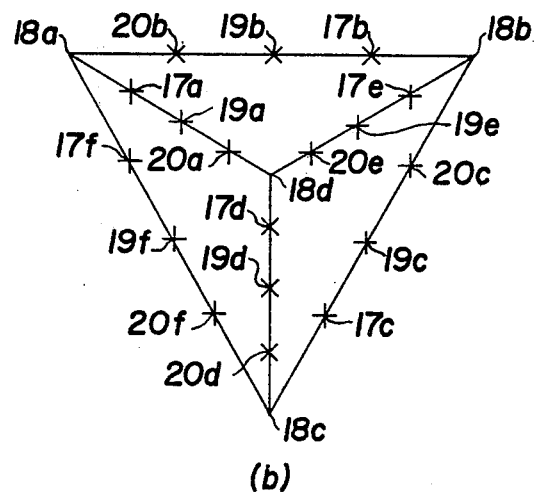
Figure 5:
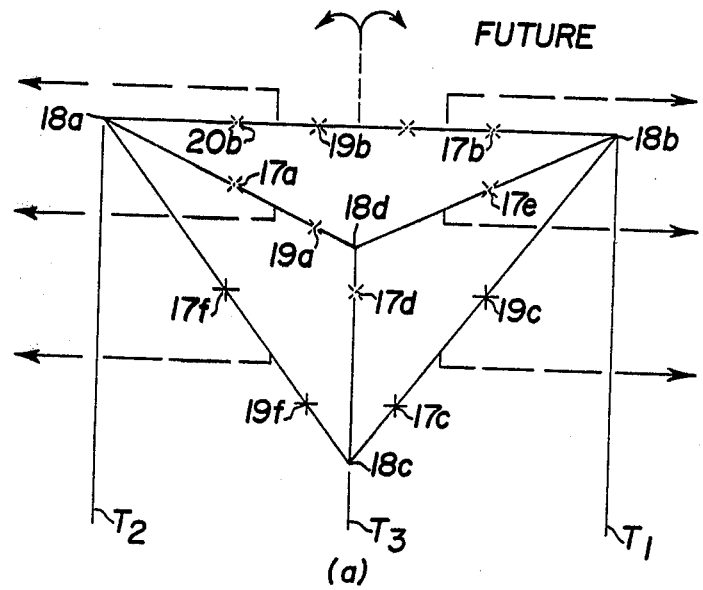
Figure 5:
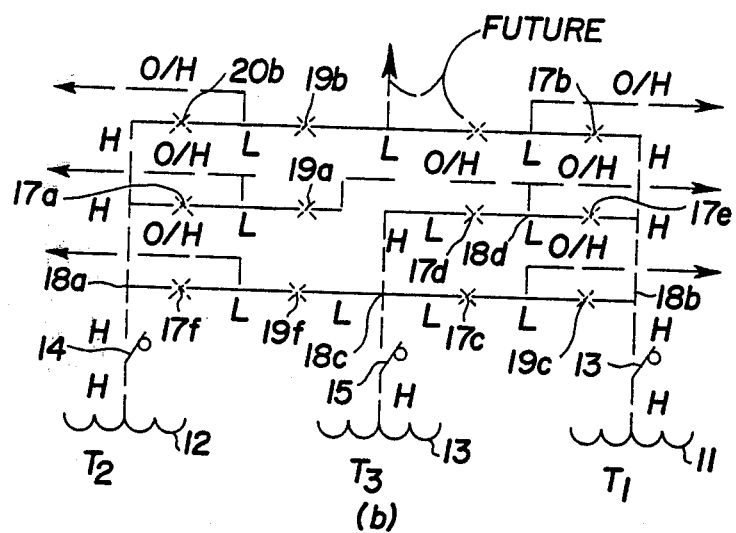
Figure 6:
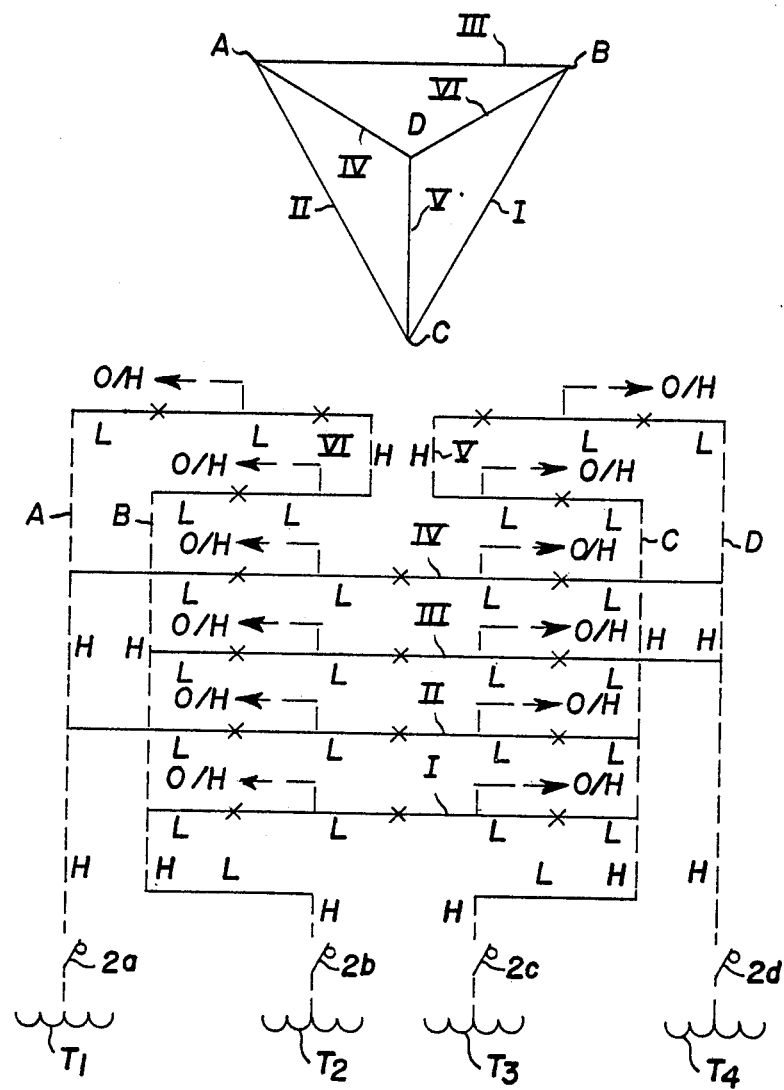
Figure 7:
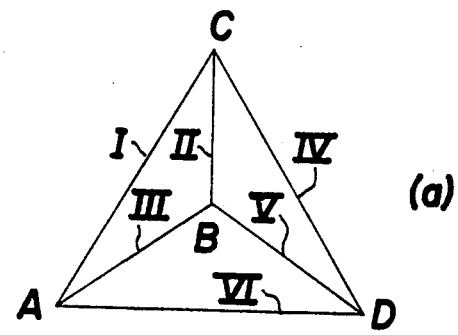
Figure 7:
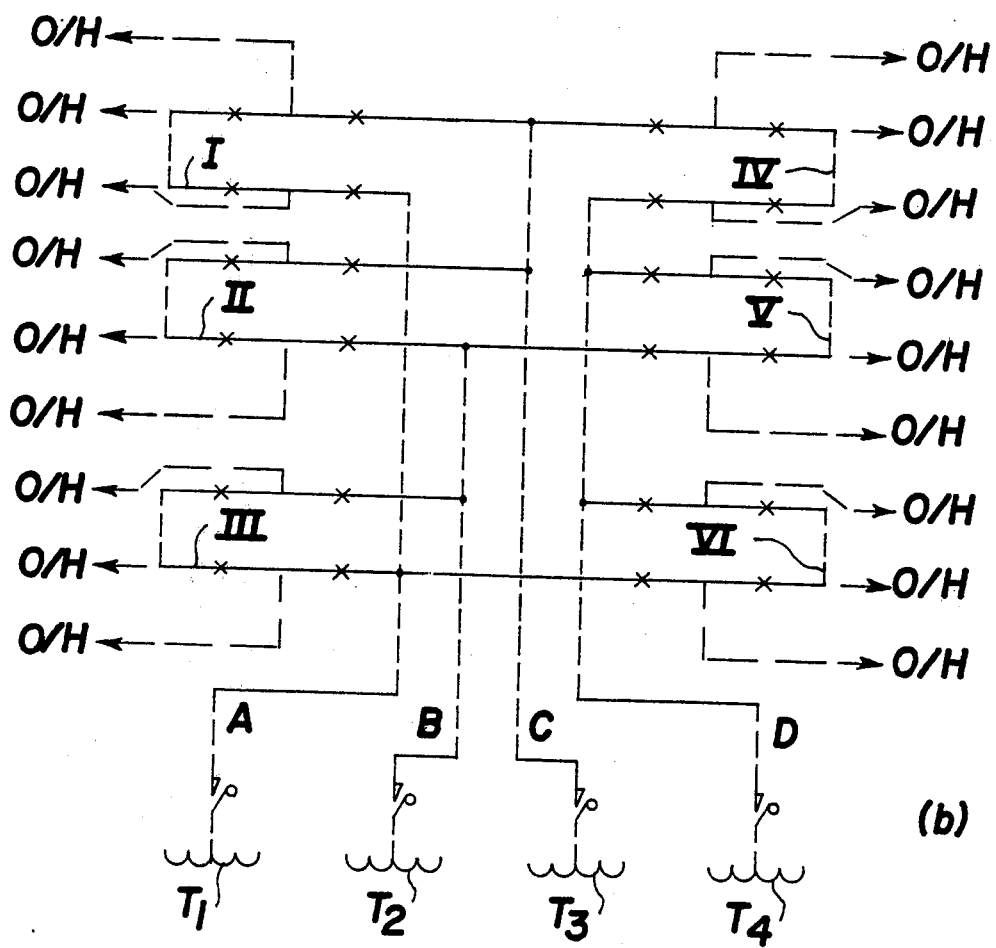
Figure 9:
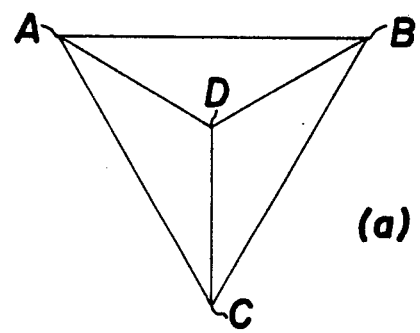
Figure 9:
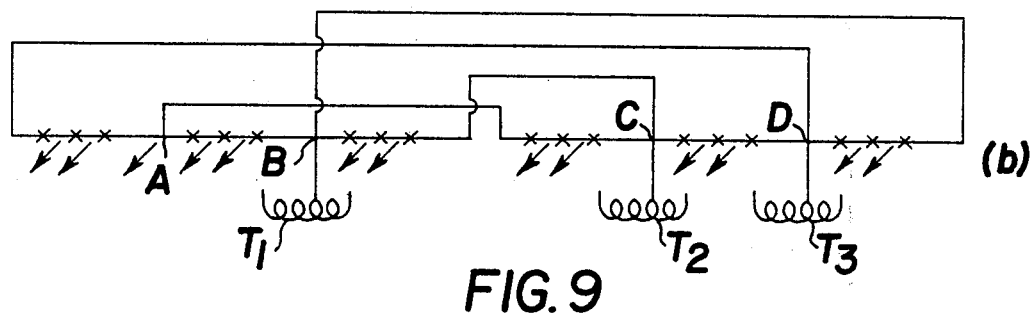

FIGS. 3A, B, C and D show four geometric representations of the simplest form of the present invention, FIGS. 4A and B show one of the geometric representations of the invention accommodating various numbers of source/load elements, FIGS. 5, 6, and 7 show one of the geometric representations of the invention accommodating various numbers of source/load elements in both schematic and more pictorial forms, and FIG. 8 (which is on the same sheet as FIG. 2) and FIG. 9 (which is on the same sheet as FIG. 4) show one of the geometric representations of the invention in schematic and more pictorial forms which illustrate the use, of compressed gas insulated switchgear.

A convention will be used for elements shown in the drawings, in which a circuit breaker is depicted as an "X" on a network branch, and a source/load element is depicted as an arrow leading from a node or other termination point. A dashed line, depicts a network branch segment which is located physically higher than other branch segments, a dashed arrow depicts an overhead cable connection to a source/load line, and a dashed "X" denotes the location for an added circuit breaker at some future time.

Figure 1:
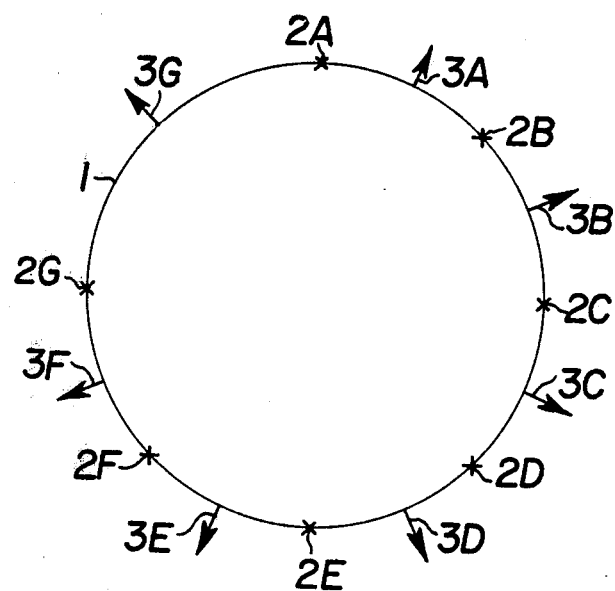
FIG. 1 shows a prior art ring bus system.

Turning first to FIG. 1, the prior art ring bus structure is shown. The conductive bus 1 is connected in a ring form. Circuit breakers 2A–2G are serially connected around the bus. Source/load elements 3A–3G are individually connected to the ring bus at the nodes between the circuit breakers. For instance, source/load element 3A is connected to ring bus 1 between circuit breakers 2A and 2B.

Should a fault occur on element 3A, for example, circuit breakers 2A and 2B will be tripped, effectively opening the ring and isolating source/load element 3A. The remainder of the ring is fed by a source of power connected to any of the remaining nodes 3B–3G, and load elements are connected to the other nodes.

Should the source of power be connected to element 3B, it will be seen that now there is only a single power path feeding around the ring to element 3G, as the redundancy was lost. Should a fault occur now on element 3D, circuit breakers 2D and 2E will open, effectively removing power from elements 3E, 3F and 3G although there is no associated fault. Clearly, once the ring is opened, the doubly redundant system whereby power is fed to every load element through two parallel paths is removed, and the security of the remaining system is jeopardized.

It should be noted that the number of circuit breakers and source/load elements in this system is equal in number, providing a ratio of 1, which is considered highly desirable and economical.

Figure 2:
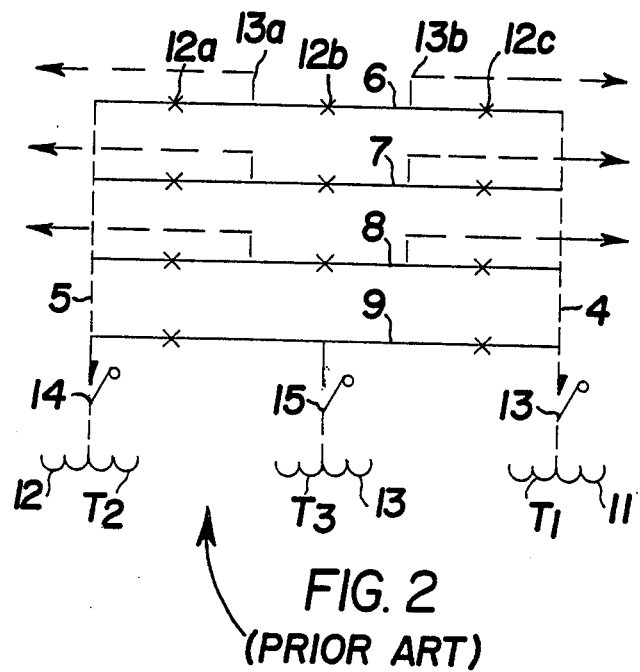
FIG. 2 is a more complex prior art system.

FIG. 2 shows a prior art system in which two main buses 4 and 5 are employed to connect branch buses 6, 7, 8, and 9 in parallel. Each of the branch buses 6, 7, 8 and 9 is connected between the two buses 4 and 5 so as to form a multiplicity of rings. The main buses are connected to transformers 11 and 12, and a third transformer 13 is connected to a central portion of branch bus 9.

FIG. 2 shows a system in which three serially connected circuit breakers are present in each branch bus. For instance, branch bus 6 is comprised of circuit breakers 12A, 12B, and 12C. Elements 13A and 13B are connected to the junctions between pairs of circuit breakers.

As noted earlier, it is undesirable to have load elements connected to buses 4 and 5, since should a fault occur associated with one of these buses, the circuit breakers in each of the four branch buses adjacent to the faulted main bus would have to be opened, isolating not only the faulty load, but also opening all of the multiple rings. Consequently, security of the system would be jeopardized.

Nevertheless, in FIG. 2, the transformers 11 and 12 are connected to the main buses to minimize the required number of circuit breakers. However, switching of transformers 11 and 12 by action of the 4 circuit breakers adjacent to each of the main buses is avoided for all routine (non-fault) operations by appropriately actuating their associated disconnect switches 13 and 14. For this purpose, these 2 disconnect switches must have special interrupting and magnetizing current switching capabilities and are known in the utility industry as "circuit switchers". Transformer 13, which is not connected to one of the main buses is isolatable using a less critical disconnect switch 15.

Should a fault occur for instance on element 13A, circuit breakers 12A and 12B are tripped, opening the circuit and isolating element 13A from its dually redundant connection into the network. Element 13B is connected through circuit breaker 12C to bus 4, but has lost its redundant connection through circuit breaker 12B. The security of branch buses 7, 8 and 9 is not affected, since they are still locked into closed rings.

The economy of this system will be observed by considering the ratio of circuit breakers to source/load elements. This system utilizes eleven circuit breakers, for six transmission line positions and three transformer positions. In addition, two special isolation switches are used. Most branches have three circuit breakers and two elements for a ratio of 1½. Branch 9 and the transformer connections and exceptions to this constant ratio and hence, the network is known in the industry as a "modified breaker and one-half scheme".

To obtain the increased redundancy, more switching means are required to service a given number of elements than the ring bus system of FIG. 1. The costs are therefore considerably increased.

FIG. 3 depicts the basic form of the present invention rearranged in four different ways. Considering FIG. 3A, the switching network is comprised of six conducting branches 16A–16F. Each branch contains at least one circuit breaker 17A–17F or other switching means. The branches are connected at their ends so as to form four three-sided rings. A careful consideration of FIG. 3A will show that each branch forms the side of and is shared by two of the rings.

As a result, four nodes 18A, 18B, 18C, and 18D are formed at the end connection points of the branches, where source/load elements can be connected.

Each node is isolatable from the other nodes by the opening of a maximum of three of the circuit breakers. For instance, should a fault occur at the elements connected to load 18A, circuit breakers 17A, 17F, and 17B will trip, effectively isolating node 18A from the remainder of the system.

However, consider the remaining nodes 18B, 18C, and 18D. Each of these nodes remain doubly redundant, since there are two paths through which power can flow thereto.

FIGS. 3B, 3C and 3D are similar to FIG. 3A, but reconfigured in space to provide various physical representations for illustration. They are otherwise electrically equivalent to FIG. 3A. The reference numerals used are similar to FIG. 3A. Each circuit consists of four nodes and six branches. For further ease of description, the form of the invention can therefore be referred to as a "4×6 network".

In FIG. 3A the 4×6 network has a double-crossed ring; FIG. 3B shows that the same network may be considered as four intermeshed rings each containing three branches; FIG. 3C illustrates the same network, but has a ring divided into three segments by three radially oriented branches which are themselves joined together at the center; FIG. 3D shows the 4>6 network as the outline edges of the four faces of a tetrahedron.

Since each of six branches contains one circuit breaker and there are 4 nodes for elements, this simplest network is clearly a breaker and ½ configuration. It should be noted, however, that instead of the prior art form of a pair of main buses present, there are four separated nodes, any one of which can be isolated from the other nodes by opening no more than three circuit breakers. Since the remaining nodes are still locked into a closed ring after isolation of any one of the nodes, the security of the remaining three nodes is maintained.

Turning now to FIG. 4, it will be seen that the basic configuration of FIG. 3B, for example, can be expanded to accommodate more than four source/load elements. Additional circuit breakers can be added in any or all of the six branches. Each additional circuit breaker connected into a given branch provides an added doubly-redundant nodal or connection position for the connection of another source/load element. For example, in FIG. 4A, each of the branches contains an additional circuit breaker 19A–19F. The locations between each pair of circuit breakers 17A–19A, 17B–19B, 17C–19C, etc. provide the additional nodal positions for the connection of additional source/load elements. This configuration therefore provides for four triple-connected nodes and six double-connected nodes, to accommodate the connection of ten elements. There are twelve circuit breakers present, giving a ratio of circuit breakers to elements of 1 1/5 for this two circuit breaker per branch system.

FIG. 4B shows a further expanded system, in which an additional circuit breaker has been added to each branch to accommodate more elements. The additional circuit breakers are referenced as 20A–20F. Therefore twelve double-connected nodes are formed between circuit breakers for connection of source/load elements as well as four triple connected nodes, giving a total combination of sixteen possible elements. Eighteen circuit breakers are used, giving a ratio of 1⅛ circuit breakers per element for this three circuit breaker per branch network.

In a similar manner larger networks can be built up, for example a four circuit breaker per branch system contains four triple connected nodes and eighteen double connected nodes for possible accommodation of twenty-two elements with twenty-four circuit breakers. The ratio is thus 1 1/11 circuit breakers per element. It is believed clear that as the number of nodes increases, the ratio approaches "1" and the efficiency of utilization of circuit breakers increases.

A prior art breaker and one-third system would have required thirty circuit breakers to switch the same twenty-two elements rather than twenty-four as in the present network. Moreover, during the process of any single fault being cleared by the tripping of appropriate circuit breakers in the present network, the majority of the system remains uncompromised on at least one closed ring. Thus, examination of FIGS. 4A and B will verify that a fault on a single element attached to any double-redundant node necessitates protection system tripping action which electrically opens only 1 branch always leaves 2 intermeshed rings closed and undisturbed and a fault on a single element attached to any triple-redundant node necessitates protection system tripping action which electrically opens 3 branches but always leaves the other 3 branches secure and undisturbed in the form of a closed ring. Clearly the 4×6 switching network is superior in security at the same time as being more economical in the utilization of circuit breakers and associated switch gear than the prior art systems.

For any 4×6 switching network there is a fixed relationship between the number "n" of the source/load elements and the required number "N" of circuit breakers. This relationship can be expressed as $$N = n + 2$$

or, $$n = N - 2$$

In other words, the number, "N", of circuit breakers required to form a 4×6 switching network which will accommodate "n" source/load elements is only two more than is required for a single ring with "n" source/load positions. The "extra" two circuit breakers are necessary to form the basic 4×6 configuration. Beyond this, as the power switching station expands, each additional circuit breaker provides an additional source/load element position so that with increasing requirement for source/load element positions, the ratio of circuit breakers to source/load elements approaches "1". The prior art 2, 1½, and 1⅝ circuit breaker schemes do not provide this economy in circuit breaker usage since the first source/load element in each added new branch requires two circuit breakers.

Large stations utilizing the prior art 2, 1½, or 1⅝ circuit breaker schemes may each have six or more circuit breakers connected to each of the main buses. This is undesirable because it must be recognized that as the number of circuit breakers connected to a bus zone increases, so also is there a corresponding increased statistical probability of misoperation. In the 4×6 network there are never more than three circuit breakers connected to a zone and there are only four such three circuit breaker zones. Back-up tripping of adjacent circuit breakers in the event of a circuit breaker failure never requires tripping of more than two adjacent circuit breakers. In contrast, for prior art 2, 1½ or 1⅓ circuit breaker schemes, failure of any circuit breaker connected to a main bus requires back-up tripping of all other circuit breakers connected to that same bus. Thus in addition to the degradation of station security due to possible breaker failure, the prior art 2, 1½, and 1⅓ circuit breaker schemes incur an additional penalty in their requirement for more extensive relaying to provide breaker failure back-up protection.

FIGS. 5A and 5B are equivalent single-line diagrams of the 4×6 network which will satisfy the switching requirements of the prior art network shown in FIG. 2. FIG. 5A illustrates the scheme of connections for the 4×6 network while FIG. 5B portrays the rectangular placement of buswork and switchgear for a typical 4×6 switchyard layout. It can be verified that FIG. 5B is a 4×6 network by comparing its components with those of FIG. 5A. Both FIGS. 5A and B use the same reference numerals designated in FIGS. 4A and 4B. It should be noted that the numbers of circuit breakers in some of the six branches of FIG. 5A are not evenly distributed, and were chosen to simplify the physical connections represented in FIG. 5B for a typical 500 kV, three phase AC switch-yard utilizing conventional outdoor switchgear connected with industry standard "low-profile" tubular bus work set at two levels to facilitate conductive crossovers. A third level of conductor is provided by the employment of standard overhead cables. The high bus work is labelled "H", the low bus work has "L" and the overhead cable has O/H. The designations $T_1$, $T_2$ and $T_3$ designate the locations for connection of transformers.

It should be noted that ordinary disconnect switches 13, 14 and 15 need only be used (FIG. 5B) rather than complex circuit switchers as the node to which each transformer is connected can be isolated by opening of only three circuit breakers while the majority of the network remains in a secure ring form. The cost is therefore further reduced from the prior art.

A further circuit breaker and node are shown in dashed line to indicate an example of where a further circuit breaker can be added and a further source/load element connected for expansion of the 4×6 network.

FIG. 6 illustrates a low profile outdoor switchgear embodiment of the 4×6 network having three circuit breakers per branch as represented schematically in FIG. 4B. The scheme of branch connections to form the 4×6 network is shown as FIG. 6A and the equivalent physical network arrangement is portrayed in FIG. 6B. For ease of understanding this configuration, the circuit breakers have not been given reference numerals, but are merely shown schematically. However the corresponding branches of FIGS. 6A and 6B have been referenced in corresponding Roman numerals. Four power transformers $T_1$, $T_2$, $T_3$ and $T_4$ are shown connected to source/load element nodes through disconnect switches 21A–21D. The various levels of bus work and overhead cables for connection to other source/load elements are shown with designations similar to those of FIG. 5.

It should be noted that this station with sixteen elements comprised of twelve line positions and four transformer positions can be implemented with only eighteen circuit breakers whereas the prior art breaker and one-half embodiment or the same station would require twenty-four circuit breakers.

FIG. 7B illustrates a low-profile outdoor switchgear embodiment of the 4×6 network having four circuit breakers per branch. The scheme of branch connections to form the 4×6 network is illustrated in FIG. 7A. The corresponding branches of FIGS. 7A and B are referenced in corresponding Roman numerals.

It is to be emphasized that each branch of a 4×6 network need have, as a minimum, only one switching means. Hence, FIG. 7B can be modified to suit a particular application by omitting any or all but one of the circuit breakers from any of the branches, as required. Moreover, a simple re-orientation of selected branches are made (for example, re-orient branches I and IV), to accommodate source/load lines on three sides of the switchyard.

To conserve land area, compressed gas insulated switchgear devices can be used in the present invention in which the spacing requirements for the conductors and elements are considerably reduced, particularly because the conductors are insulated and contained within gas-filled ducts which can be mounted together and cross over each other in much closer proximity than is possible for conventional switchgear. Such switchgear and ducts normally contain a compressed insulating gas such as sulfur hexafluoride.

The physical size of the compressed gas insulated switchgear apparatus and the spacing requirements for the transmission line positions are such that the circuit breakers can be located in straight line rows with a minimum of interconnecting bus duct work. Thus a double row of circuit breakers can be built for stations in which the transmission lines egress on both sides of the station, while a single row can accommodate all lines egressing out of the same side of the station as is illustrated, respectively, in FIGS. 8 and 9.

FIGS. 8B, and C are single-line diagrams of the 4×6 network utilized in the aforementioned compressed gas insulated configuration. FIG. 8A shows a one circuit breaker per branch network as described earlier with reference to FIG. 3A and which, by comparison, will verify that FIGS. 8B and C are 4×6 networks. The nodes are referenced A, B, C, and D, while the circuit breakers are shown by schematic representation but are unreferenced.

FIG. 8B shows the same one circuit breaker per branch network but representing the physical configuration of gas insulated circuit breakers and buswork with the elements similarly identified.

FIG. 8C shows the physical layout of a compressed gas insulated form of a two circuit breaker per branch 4×6 network with the nodes similarly identified as well as the circuit breakers by schematic symbol. Transformers $T_1$, $T_2$, and $T_3$ are connected to nodes A, B, and D. The arrows depict further source/load nodes to which transmission lines are connected. This system accommodates ten source/load nodes with twelve circuit breakers. This network is built in this figure with a double row of circuit breakers and buswork to match the transmission line egress outwardly on both sides of the station.

FIG. 9A shows the connection scheme of a basic network similar to that of FIG. 3B, and FIG. 9B shows a corresponding physical three circuit breaker per branch network in which the transmission lines all egress on the same side of a single row of gas insulated circuit breakers and buswork. The reference are similar to those of FIG. 8.

It should be noted that the networks of FIGS. 8 and 9, as well as the ones previously described can be built up into more complex networks by adding circuit breakers or other like switchgear as described earlier. Networks can also be connected together at one or more nodes.

Further, the network can be used with D.C. or A.C. polyphase or single phase current. Rather than being restricted to use in switchyards, it is usefully employed at locations where there is a multiplicity of loads, such as in electric reduction industrial applications, with electrolytic loads, aluminum potlines, etc. Where windings of transformers are connected to various nodes, the other winding thereof can be connected to a network constructed of similar principles, as this invention, or of conventional form, operating at a different voltage.

The present invention thus achieves a considerable reduction in switchgear cost of power switchyards, while at the same time achieving increased security.

Other structures falling within the same principles may now be conceived by someone understanding this invention and such are considered to be within the scope of this invention as defined by the appended claims.

The embodiments of the invention in which an exclusive property or privilege is claimed are defined as follows:

1. A switching network consisting of six conducting branches, each branch containing at least one switching means, the branching being connected at their ends so as to form four 3-sided rings, each branch forming a side of and being shared by two of said rings, whereby four triple connected nodes are formed at the end connection points of the branches for connection thereto of source/load elements, each node being isolatable from the other nodes by the opening of a maximum of three of said switching means.

2. A switching network as defined in claim 1, including an additional switching means in at least one of said branches to provide a further double-connected source/load connection point between the additional switching means and said one switching means in said one branch, the additional connection point being isolatable from the remainder of said network by opening of the adjacent pair of switching means.

3. A switching network as defined in claim 1 including additional switching means connected in series in each of said branches, whereby additional double-connected source/load connection points are provided between and are isolatable from the remainder of said network by operation of respective pairs of said switching means.

4. A switching network as defined in claim 3 in which there are "n" source/load connection points or nodes, and "N" switching means, where $N = n+2$ and n is equal to or greater than 4.

5. A switching network as defined in claim 4 in which $N/n$ is between $1\frac{1}{2}$ and 1.

6. A switching network as defined in claim 2, 3 or 4 further including power transformers, each respectively connected through a disconnect switch to one of said nodes, and means for connecting source/load conductors to individual ones of said connection points.

7. A switching network as defined in claim 2, 3 or 4 in which the source/load connection points or nodes are located along a pair of parallel rows of circuit breakers and buswork.

8. A switching network as defined in claim 2, 3 or 4 in which the source/load connection points or nodes are located along a single row of circuit breakers and buswork.

* * * * *

UNITED STATES PATENT AND TRADEMARK OFFICE
CERTIFICATE OF CORRECTION

PATENT NO. : 4,247,787
DATED : January 27, 1981
INVENTOR(S) : RONALD PAGE

It is certified that error appears in the above—identified patent and that said Letters Patent is hereby corrected as shown below:

Col. 4, line 63,
"4 > 6" should be --4 x 6--;

Col. 6, Line 21,
"1 5/8" should be --1 1/3--;

Col. 6, Line 25,
"1 5/8" should be --1 1/3--;

Col. 7, Line 33,
"or" should be --for--;

Claim 1, Line 3,
"branching" should be --branches--.

DRAWINGS:

In Fig. 6A, the Roman Numerals III and IV, should be interchanged to agree with Fig. 6B in the printed Specification.

Signed and Sealed this

Fourteenth Day of July 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,247,787
DATED : January 27, 1981
INVENTOR(S) : RONALD PAGE

It is certified that error appears in the above-identified patent and that said Letters Patent are hereby corrected as shown below:

Col. 4, line 20, change "and" to --are--;

Col. 5, line 58, after "branch" insert -- but --.

Col. 6, lines 5, 8, the Italic letter "n" should be a standard lower case letter --n-- in order to agree with line 2;

Col. 7, line 48, change "are" to --can be--.

The text of the specification uses Figure numbers with capital letter suffixes while the drawing uses lower case letter suffixes. The inventor, Mr. Page, believes that Figs. 5 and 6 might be a little easier to follow if corrected as shown in red on the attached prints.

Signed and Sealed this

Twenty-fourth Day of November 1981

[SEAL]

Attest:

GERALD J. MOSSINGHOFF

Attesting Officer     Commissioner of Patents and Trademarks